（12） United States Patent
Yhuellou et al.

(10) Patent No.: US 10,308,376 B2
(45) Date of Patent: Jun. 4, 2019

(54) PROPELLANT FEED SYSTEM FOR A SPACE VEHICLE

(71) Applicant: SAFRAN AIRCRAFT ENGINES, Paris (FR)

(72) Inventors: Olivier Yhuellou, St Marcel (FR); Georges Verdier, Tourny (FR); Olivier Adam, St Pierre de Bailleul (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 358 days.

(21) Appl. No.: 15/114,228

(22) PCT Filed: Jan. 22, 2015

(86) PCT No.: PCT/FR2015/050157
§ 371 (c)(1),
(2) Date: Jul. 26, 2016

(87) PCT Pub. No.: WO2015/114238
PCT Pub. Date: Aug. 6, 2015

(65) Prior Publication Data
US 2017/0008649 A1 Jan. 12, 2017

(30) Foreign Application Priority Data
Jan. 29, 2014 (FR) .................. 14 00227

(51) Int. Cl.
B64G 5/00 (2006.01)
B64G 1/40 (2006.01)
F02K 9/60 (2006.01)

(52) U.S. Cl.
CPC ............ B64G 1/402 (2013.01); B64G 5/00 (2013.01); F02K 9/605 (2013.01); F05D 2220/80 (2013.01)

(58) Field of Classification Search
CPC .......... B64G 1/402; B64G 5/00; F02K 9/605; F05D 2220/80; F05D 2220/90
See application file for complete search history.

(56) References Cited

U.S. PATENT DOCUMENTS 4,609,169 A * 9/1986 Schweickert ............ B64G 1/26
137/255
5,404,923 A * 4/1995 Yamamoto ............... B64G 5/00
137/355.2

(Continued)

FOREIGN PATENT DOCUMENTS

FR 2 943 626 A1 10/2010
JP H04249685 A 9/1992
JP H11230402 A 8/1999

OTHER PUBLICATIONS

International Search Report in corresponding International Application No. PCT/FR2015/050157 dated May 18, 2015 (8 pages—English Translation included).

(Continued)

Primary Examiner — Nicolas A Arnett
(74) Attorney, Agent, or Firm — Bookoff McAndrews, PLLC

(57) ABSTRACT

A system for feeding a space vehicle with propellant, the system comprising:
an on-board device (100) comprising:
a frame (110) having a feed orifice (112) leading to an on-board tank (120); and
a valve (130) adapted to act selectively to shut or open said feed orifice (112);
a ground device (200) comprising:
a feed duct (210); and
a control body (240) surrounding a free end (212) of the feed duct (210) and provided with an actuator (250);
the on-board device (100) and the ground device (200) being configured so as to be capable of being associated (Continued)

Figure 1:
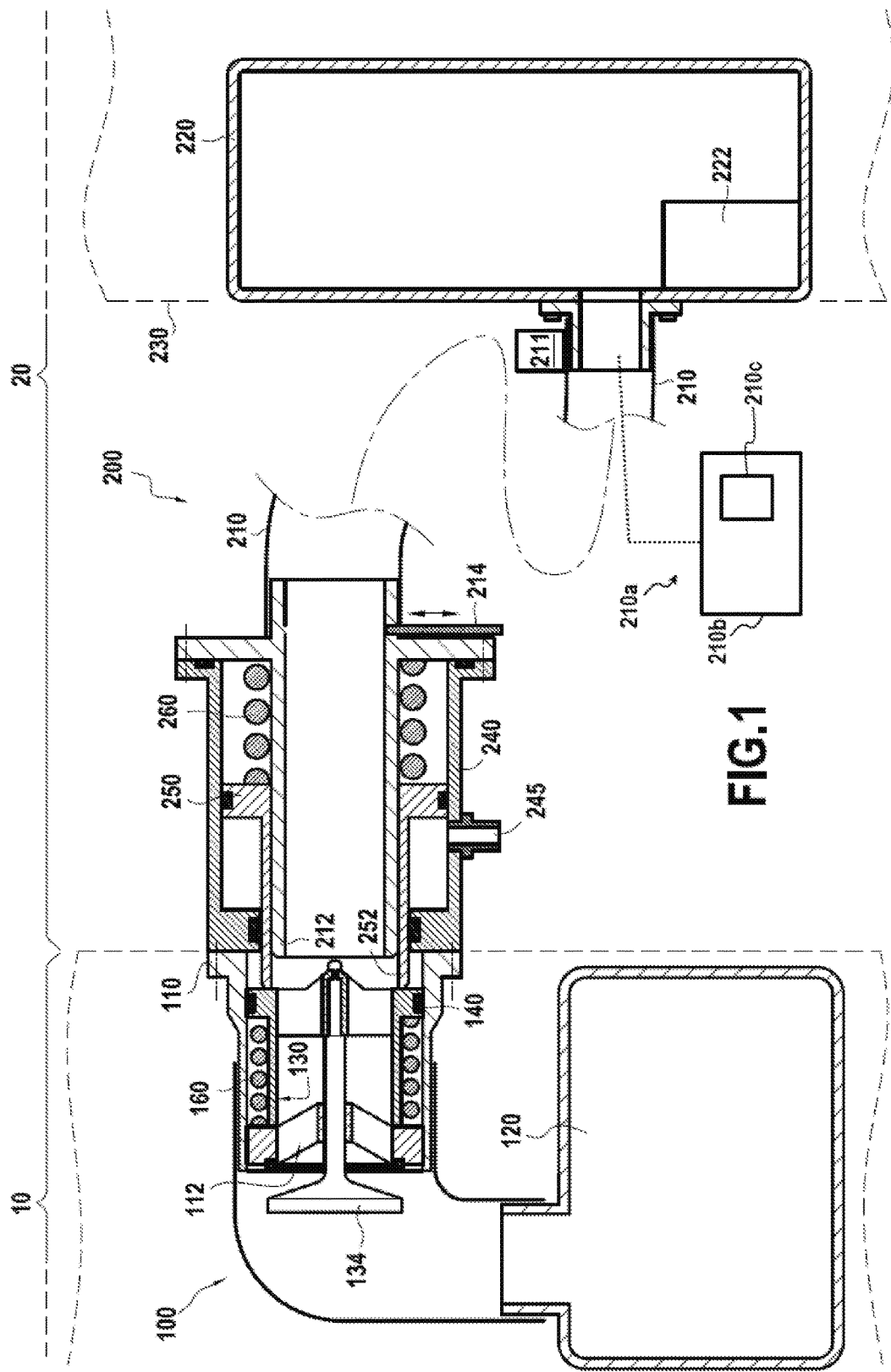

so that, in an open configuration, propellant can be transferred from the feed duct (210) to the on-board tank (120), the actuator (250) being configured so as to control the opening and shutting of the feed orifice (112) by the valve (130);

the system being characterized in that said actuator (250) surrounds the outer periphery of the feed duct (210).

9 Claims, 2 Drawing Sheets

(56) References Cited

U.S. PATENT DOCUMENTS

| | | | | |
|---|---|---|---|---|
| 5,904,302 | A * | 5/1999 | Brown | B64F 1/28 137/614.06 |
| 6,125,871 | A * | 10/2000 | Drab | B08B 9/021 134/113 |
| 6,142,194 | A * | 11/2000 | McClaran | B67D 7/42 137/614.06 |
| 7,575,200 | B2 * | 8/2009 | Behrens | B64G 1/1078 244/172.3 |
| 8,074,935 | B2 * | 12/2011 | Gryniewski | B64G 1/1078 244/135 A |
| 8,820,353 | B2 * | 9/2014 | Yandle | F16L 37/35 137/614.04 |
| 8,991,444 | B2 * | 3/2015 | Boutet | B64G 5/00 141/311 R |
| 9,108,747 | B2 * | 8/2015 | Roberts | B64G 4/00 |
| 9,231,323 | B1 * | 1/2016 | Jaeger | F16L 37/002 |
| 2001/0054818 | A1 * | 12/2001 | Fujikawa | F16L 29/007 285/18 |
| 2004/0129906 | A1 * | 7/2004 | Authelet | F16K 27/08 251/12 |
| 2005/0247352 | A1 * | 11/2005 | Kamiya | F16L 37/565 137/614.04 |
| 2007/0051854 | A1 * | 3/2007 | Behrens | B64G 1/1078 244/172.3 |
| 2012/0000575 | A1 * | 1/2012 | Yandle | F16L 37/35 141/98 |
| 2012/0024421 | A1 * | 2/2012 | Boutet | B64G 5/00 141/311 R |
| 2013/0153710 | A1 * | 6/2013 | Roberts | B64G 4/00 244/172.5 |
| 2017/0260929 | A1 * | 9/2017 | Yhuellou | B64G 5/00 |

OTHER PUBLICATIONS

Office Action for corresponding Japanese Application No. 2016-549503, dated Nov. 20, 2018 (3 pages).

\* cited by examiner

PROPELLANT FEED SYSTEM FOR A SPACE VEHICLE

CROSS-REFERENCE TO RELATED APPLICATIONS

This application is the U.S. national phase entry under 35 U.S.C. § 371 of International Application No. PCT/FR2015/050157, filed on Jan. 22, 2015, which claims priority to French Patent Application No. 1400227, filed on Jan. 29, 2014.

GENERAL TECHNICAL FIELD

The present invention relates to the field of systems for supplying a space vehicle with propellant, and finds a particular application in cryogenic or non-cryogenic thrusters of a launcher.

STATE OF THE ART

A space vehicle such as a rocket needs to be supplied with propellant as close as possible to take off, in order to minimize the length of time the propellant is stored in the tanks of the rocket.

However, existing devices for feeding the tanks of a spacecraft with propellant give rise to large head losses, thereby considerably reducing the rate at which the tank can be filled and considerably lengthening the duration of filling, thereby lengthening the time propellant is stored in the tanks of the space vehicle.

Furthermore, the use of a cryogenic propellant makes using certain technologies problematic, and in particular using electromagnetic actuators, which are not compatible with such temperatures, e.g. about −253° C.

Finally, modifying components on a space vehicle is problematic since it requires performing numerous tests, which are complex and lengthy to carry out. It is therefore important to avoid making on-board modifications, i.e. to the structure of the spacecraft.

SUMMARY OF THE INVENTION

In order to satisfy these various problems at least in part, the invention proposes a system for feeding a space vehicle with propellant, the system comprising:
  an on-board device comprising:
    a frame having a feed orifice leading to an on-board tank; and
    a valve adapted to act selectively to shut or open said feed orifice;
  a ground device comprising:
    a feed duct having a free end; and
    a control body surrounding said free end of the feed duct and provided with an actuator;
  the on-board device and the ground device being configured so as to be capable of being associated so that, in an open configuration, propellant can be transferred from the feed duct to the on-board tank, and in a shut configuration, the on-board tank can be isolated from the feed duct, the actuator being configured so as to control the opening and shutting of the feed orifice by the valve;
  the system being characterized in that said actuator surrounds the outer periphery of the feed duct.

The present invention thus proposes a propellant feed system for a space vehicle in which head losses at the junction between the space vehicle and ground equipment are minimized, and the time required for filling the tank of the space vehicle is thus greatly shortened. Furthermore, the dimensions of the valve are small, thereby contributing to reducing on-board weight.

The proposed system can also be used on existing space vehicles, without requiring any modification to the space vehicle itself.

Finally, the proposed system is compatible with a cryogenic propellant.

In a particular embodiment, the ground device comprises a launch structure having a ground tank to which the feed duct is connected, the launch structure further including a shutter adapted:
  in a feed configuration, to connect said feed duct to the ground tank; and
  in a shutting configuration, to isolate the feed duct from the ground tank.

The launch structure then typically further comprises a drain system adapted to purge the feed duct so that on application of a command, said drain system sucks in the propellant contained in the feed duct and stores it in a tank of the base.

The propellant feed system may then further include a leak detection device adapted to perform leak testing in said feed duct when the valve shuts the feed orifice.

The actuator is typically coupled to resilient return means exerting a thrust force on the actuator tending to move it towards the open configuration in which the actuator opens the valve.

The system then advantageously includes a control, e.g. a pneumatic control, adapted to exert a force on the actuator opposing the thrust force applied by the resilient return means so as to tend to move the actuator towards the closed configuration.

Conversely, the actuator may be coupled to resilient return means exerting a thrust force on the actuator tending to move it towards the shut configuration in which the actuator shuts the valve.

The system then advantageously includes a control, e.g. a pneumatic control, adapted to exert a force on the actuator opposing the thrust force applied by the resilient return means, so as to tend to move the actuator towards the open configuration.

PRESENTATION OF THE FIGURES

Figure 2:
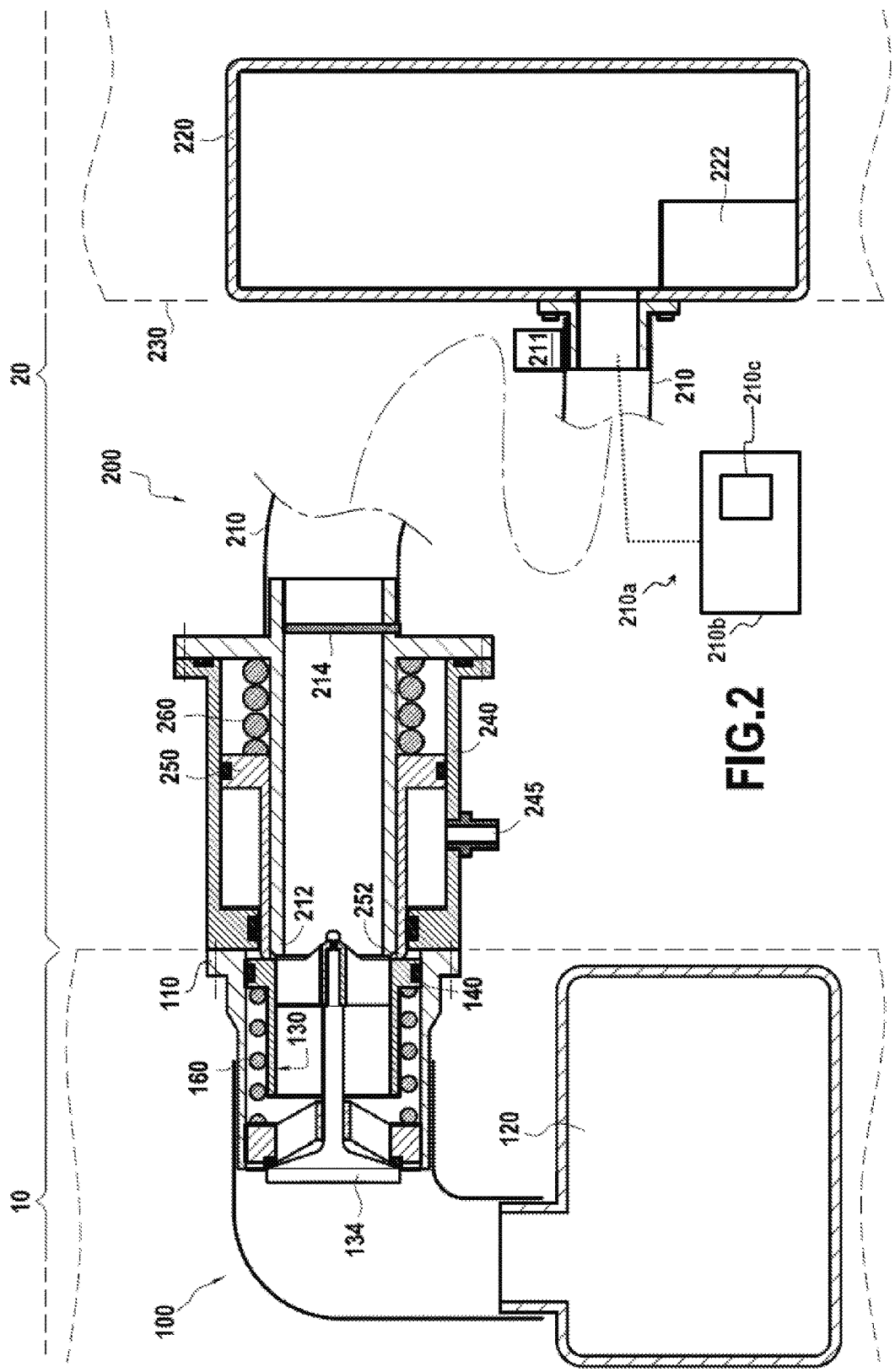

Other characteristics, objects, and advantages of the invention appear from the following description, which is purely illustrative and non-limiting, and which should be read with reference to the accompanying drawings, in which:

FIG. 1 shows a propellant feed system in one aspect of the invention in a feed configuration; and FIG. 2 shows the FIG. 1 system in a closed configuration.

In the figures, elements that are common are identified by identical numerical references.

DETAILED DESCRIPTION

FIG. 1 shows a propellant feed system in an aspect of the invention in a feed configuration.

This figure shows an on-board side 10 and a ground side 20, corresponding respectively to equipment on board a spacecraft, and to equipment mounted on the ground.

The feed system shown in FIG. 1 thus comprises on-board side equipment 10 and ground side equipment 20.

More precisely, the system shown comprises on the on-board side 10 an on-board device 100 comprising:
- a frame 110 having a feed orifice 112 connected to an on-board tank 120;
- a slidably mounted valve 134 coupled to a valve guide 130 and adapted to act selectively to shut or not shut the feed orifice 112 in the frame 110.

The valve 134 is arranged in such a manner as to shut or not shut the feed orifice 112, as a function of the movement of the valve in the valve guide 130.

The guide element 140 is advantageously positioned between the valve guide 130 and the frame 110.

The valve guide 130 is coupled to thrust means 160 adapted, in the absence of additional forces being applied, to exert a thrust force on the valve guide 130 so as to hold the valve 134 in the position shutting the feed orifice 112.

On the ground side 20, as shown in FIG. 1, there is a ground device 200 comprising:
- a feed duct 210 having a free end 212; and
- a ground tank 220 mounted in a launch structure 230.

The feed duct has a control body 240 arranged to surround the free end 212 and to enable it to be fastened to the frame 110. The control body 240 is fitted with an actuator 250 slidably mounted around the free end 212 on the outer periphery of the feed duct 210. The actuator 250 is coupled to resilient return means 260, specifically a thrust spring, exerting a thrust force on the actuator 250 tending to move it so that a free end 252 of the actuator 250 extends beyond the free end 212 of the feed duct 210.

The control body 240 as shown also has a control orifice 245 adapted to enable control pressure to be applied to the actuator 250 opposing the thrust force exerted by the resilient return means 260, thus enabling the actuator 250 to be moved so as to bring its free end 252 towards the free end 212 of the feed duct 210.

When the on-board device 100 and the ground device 200 are associated with each other, the free end 212 of the feed duct 210 faces the feed orifice 112 in the frame 110.

The actuator 250 is thus likewise placed facing the feed orifice 212 in the frame 110. The actuator 250 is configured so that when the on-board device 100 and the ground device 200 are associated in this way, the free end 252 of the actuator 250 comes into contact with the moving equipment 130, advantageously substantially at the outer periphery of the moving equipment 130.

The actuator 250 can thus cause the valve 130 to move, and thus open or not open the feed orifice 112, e.g. by moving the valve guide 130 so that the valve 134 shuts or does not shut feed channels arranged in the proximity of the feed orifice 112.

The resilient return means 260 as shown exert a thrust force on the actuator 250 tending to move the valve guide 130 so that the valve 134 opens the feed orifice 112 and thus allows fluid to pass from the feed duct 210 to the on-board tank 120.

Conversely, applying a control pressure via the control orifice 245 enables the actuator 250 to be operated so as to reduce or cancel the thrust force that it exerts on the valve 130; the valve 130 is then returned into a shut configuration by the thrust means 160, in which the valve 134 shuts the feed orifice 112, as shown in FIG. 2.

The feed orifice 112 can thus be opened or shut by means for controlling the pressure applied via the control orifice 245.

In the embodiment shown, in the absence of control pressure applied via the control orifice 245, the actuator 250 is subjected to thrust force exerted by the resilient return means 260 tending to open the feed orifice 112; this serves to open the feed orifice 112.

An inverse configuration could also be provided, in which there is shutting of the feed orifice 112 that is controlled. The resilient return means are then configured to exert a force tending to move the actuator 250 so as to eliminate or at least minimize the force it applies against the valve guide 130, the valve 134 thus shutting the feed orifice 112 in the absence of pressure applied via the control orifice 245.

The feed duct 210 is connected to the ground tank 220, which is associated with a transfer system 222 that typically comprises a pump configured so as to enable the fluid, such as the propellant, to be transferred from the ground tank 220 to the on-board tank 120 via the feed duct 210 and the feed orifice 112.

A shutter 214 is also positioned close to the free end 212 of the feed duct 210, and is adapted, in a shutting configuration, to shut the feed duct 210, and in a feed configuration, to enable fluid to be transferred from the ground tank 220 to the on-board tank 120. The shutter 214 is shown in the feed configuration in FIG. 1 and in the shutting configuration in FIG. 2.

There follows a description of the operation of the above-described system.

Consideration is given to an initial configuration in which the on-board device 100 and the ground device 200 are connected together. The shutter 214 is shut, as is the valve 134. The on-board tank 120 and the ground tank 220 are thus isolated from each other.

The on-board device 100 and the ground device 200 are associated as shown in FIG. 1. The admission orifice 112 is opened by the actuator 250.

The shutter 214 is opened, and the transfer system 222 is put into operation so as to fill the on-board tank 120 with fluid contained in the ground tank 220.

Once the on-board tank 120 has been filled to the desired level, filling is stopped. The actuator 250 is operated so as to cease exerting an opening force on the valve guide 130 of the valve 134, the valve body 134 thus shutting the feed orifice 112 so that the on-board tank 120 is isolated from the feed duct 210. The transfer system 222 ceases to send fluid from the ground tank 220 to the feed duct 210.

The feed duct 210 is then full of fluid. In order to avoid this fluid spilling when the on-board device 100 and the ground device 200 separate, the feed duct 210 is drained so as to purge the fluid contained therein, and then the shutter 214 is shut. The feed duct is typically drained by means of a drain system 210a, e.g. suitable for putting the feed duct 210 under pressure. The drain system 210a sucks in the propellant contained in the feed duct 210 and stores it in a tank 210c of a base 210b.

Leak tests may then be applied in the feed duct 210 by using a leak detection device 211, in particular for the purpose of verifying that the valve 134 is leaktight.

Once the tests have been performed, the spacecraft can take off, with the on-board device 100 and the ground device 200 then being separate.

The proposed system thus presents several advantages.

Firstly, positioning the actuator 250 on the outer periphery of the feed duct 210 as opposed to within the feed duct 210, makes it possible to limit the presence of components that are arranged inside the feed duct 210, and thus to limit disturbances to the flow of fluid in the feed duct 210. Head losses are thus limited, the flow can be increased, and thus the on-board tank 120 can be filled faster for a small diameter on-board valve 134.

Positioning the actuator 250 on the outer periphery of the feed duct 210 and moving the ducts of the elements for controlling the actuator 250 to the outside, also make it possible to have a feed duct that is in alignment with the feed orifice 112, which is advantageous in terms of reducing head losses.

The proposed structure for the actuator 250 and for the actuator control system is also compatible with cryogenic propellants of the kind commonly used for space vehicles, which reach temperatures of about −253° C., and which are thus incompatible with certain types of actuator, such as magnetic actuators.

Finally, the ground device 200 as described can be used without requiring structural modifications to the on-board device 100. Only the dimensions of the feed duct 210 and of the actuator 250 play a role in actuating the valve 134. The proposed ground device 200 can thus be associated with existing on-board devices 100.

The invention claimed is:

1. A system for feeding a space vehicle with propellant, the system comprising:
    an on-board device comprising:
    a frame having a feed orifice leading to an on-board tank; and
    a valve adapted to act selectively to shut or open said feed orifice;
    a ground device comprising:
    a feed duct having a free end; and
    a control body surrounding said free end of the feed duct and provided with an actuator;
    the on-board device and the ground device being configured so as to be capable of being associated so that, in an open configuration, propellant can be transferred from the feed duct to the on-board tank, and in a shut configuration, the on-board tank can be isolated from the feed duct, the actuator being configured so as to control the opening and shutting of the feed orifice by the valve;
    the system being characterized in that said actuator surrounds the outer periphery of the feed duct.

2. A system according to claim 1, wherein the ground device comprises a launch structure having a ground tank to which the feed duct is connected, said system further comprising a shutter adapted:
    in a feed configuration, to enable propellant to be transferred between the ground tank and the on-board tank; and
    in a shutting configuration, to isolate the on-board tank from the ground tank.

3. A system according to claim 2, wherein said launch structure further comprises a drain system adapted to purge the feed duct so that on application of a command, said drain system sucks in the propellant contained in the feed duct and stores it in a tank of a base.

4. A system according to claim 2, further including a leak detection device adapted to perform leak testing in said feed duct when the valve shuts the feed orifice.

5. A system according to claim 1, wherein said actuator is coupled to resilient return means exerting a thrust force on the actuator tending to move it towards an open configuration in which the actuator opens the valve.

6. A system according to claim 5, including a control adapted to exert a force on the actuator opposing the thrust force applied by the resilient return means so as to tend to move the actuator towards the closed configuration.

7. A system according to claim 6, wherein said control is a pneumatic control.

8. A system according to claim 1, wherein said actuator is coupled to resilient return means exerting a thrust force on the actuator tending to move it towards the shut configuration in which the actuator shuts the valve so that the valve shuts the feed orifice.

9. A system according to claim 8, including a control adapted to exert a force on the actuator opposing the thrust force applied by the resilient return means, so as to tend to move the actuator towards the open configuration in which the valve does not shut the feed orifice.

\* \* \* \* \*